(12) United States Patent
Kobuse (10) Patent No.: US 9,544,515 B2
(45) Date of Patent: Jan. 10, 2017

(54) IMAGE PICKUP APPARATUS AND METHOD OF CONTROLLING THE SAME, AND STORAGE MEDIUM

(71) Applicant: CANON KABUSHIKI KAISHA, Tokyo (JP)

(72) Inventor: Takenori Kobuse, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 32 days.

(21) Appl. No.: 14/645,712

(22) Filed: Mar. 12, 2015

(65) Prior Publication Data

US 2015/0264279 A1 Sep. 17, 2015

(30) Foreign Application Priority Data

Mar. 14, 2014 (JP) ................................ 2014-051586

(51) Int. Cl.
| | |
|---|---|
| *H04N 5/235* | (2006.01) |
| *H04N 5/228* | (2006.01) |
| *H04N 9/73* | (2006.01) |
| *H04N 5/353* | (2011.01) |
| *H04N 5/243* | (2006.01) |

(52) U.S. Cl.
CPC .......... *H04N 5/3532* (2013.01); *H04N 5/2351* (2013.01); *H04N 5/2354* (2013.01); *H04N 5/243* (2013.01)

(58) Field of Classification Search
CPC .......... H04N 5/341; H04N 5/243; H04N 9/77; H04N 5/21; H04N 5/2357; H04N 1/6086; H04N 5/2351; H04N 5/2354
USPC ......... 348/221.1, 222.1, 223.1, 224.1, 225.1, 348/226.1, 227.1, 228, 229.1, 230.1
See application file for complete search history.

(56) References Cited

U.S. PATENT DOCUMENTS

| | | | | |
|---|---|---|---|---|
| 2009/0135271 A1* | 5/2009 | Kurane | ................ | H04N 5/2354 348/222.1 |
| 2011/0255786 A1* | 10/2011 | Hunter | ..................... | H04N 5/21 382/190 |
| 2011/0267519 A1* | 11/2011 | Wright | ................. | H04N 5/3532 348/296 |

(Continued)

FOREIGN PATENT DOCUMENTS

JP 2012156634 8/2012

*Primary Examiner* — Chia-Wei A Chen
(74) *Attorney, Agent, or Firm* — Rossi, Kimms & McDowell LLP (57) ABSTRACT

An image pickup apparatus that can change a shutter speed while performing flash band compensation. Signal is read by an image pickup element capable of reading at a rate higher than a frame rate at which the moving image is output to an external device. An image is generated from a signal output from the image pickup element, for each frame. A frame the image of which has a band-like gap in brightness is detected from among the generated frames. A full flash image is generated from images of a plurality of the detected frames. When an accumulating time of a signal in the image pickup element is changed, a frame rate at which signals are read from the image pickup element is changed to substantially match a reciprocal number of the changed accumulating time. When the band-like gap in brightness is detected, the images of the generated frames are output after replacing the images of the plurality of the frames with the created full flash image and images of the other frames with no band-like gap in brightness.

9 Claims, 8 Drawing Sheets

(56) References Cited

U.S. PATENT DOCUMENTS

| | | | | |
|---|---|---|---|---|
| 2011/0273591 A1* | 11/2011 | Fukushima | .......... | H04N 5/2351 348/239 |
| 2012/0026359 A1* | 2/2012 | Fukushima | .......... | H04N 5/2354 348/226.1 |
| 2012/0188403 A1* | 7/2012 | Gomita | ................ | H04N 5/2354 348/226.1 |
| 2013/0208149 A1* | 8/2013 | Kamiya | ................. | H04N 5/217 348/241 |
| 2014/0152867 A1* | 6/2014 | Shirakawa | ......... | H04N 5/23232 348/226.1 |
| 2014/0232908 A1* | 8/2014 | Kishida | ................ | H04N 5/2173 348/241 |
| 2015/0229818 A1* | 8/2015 | Fukuyama | ......... | G06K 9/00228 348/367 |

\* cited by examiner

IMAGE PICKUP APPARATUS AND METHOD OF CONTROLLING THE SAME, AND STORAGE MEDIUM

BACKGROUND OF THE INVENTION

Field of the Invention

The present invention relates to an image pickup apparatus, such as a digital single-lens reflex camera and a digital video camera, and a method of controlling the image pickup apparatus, and to a storage medium, and more particularly, to an operational control technique at the time of shooting a moving image.

Description of the Related Art

In recent years, CMOS image sensors (hereafter, referred to as "CMOS sensors") have come into widespread use as image pickup elements for image pickup apparatuses, notably video cameras. Most of the CMOS sensors adopt a rolling shutter system, which consecutively performs exposures for horizontal lines, and reads a moving image signal for each line to create one frame.

In the CMOS sensor having the rolling shutter system, a difference arises between an exposure timing and a reading time for each line. Therefore, if an external flash such as strobe light having a short light-emission time is applied to a subject in shooting, an image may be generated which is divided into upper and lower portions having different brightness. Such an effect to a frame where a band-like gap in brightness occurs due to such external flash is called a "flash band effect", and various techniques to compensate for the band-like gap in brightness have been proposed.

For example, Japanese Laid-Open Patent Publication (Kokai) No. 2012-156634 discloses a detecting method and a compensating method for the flash band effect. In Japanese Laid-Open Patent Publication (Kokai) No. 2012-156634, brightness levels are compared between consecutive frames for each pixel, a horizontal line having a great amount of variation in the brightness level is identified from the comparison result and a boundary between the horizontal line having the great amount of variation and a horizontal line having a small amount of variation is detected to detect the occurrence of the flash band effect. In addition, in Japanese Laid-Open Patent Publication (Kokai) No. 2012-156634, brightness values of a pixel contained in consecutive frames are compared and the pixel is replaced with the pixel having a greater brightness value, with the pixel having a smaller brightness value, or with the pixel having the average of the brightness values, to output a compensated frame with no band-like gap in brightness.

As seen above, typical methods for compensating for the band-like gap in brightness include a method of comparing the brightness of two or more frames having the band-like gap in brightness occurring and performing an image combining process based on the comparison result.

In the case where the shutter speed of the image pickup element (equal to an exposure period (an accumulating time of electric charge being a signal) in a CMOS sensor) is shorter than a frame rate (a vertical synchronizing signal input into the image pickup element) at which the image pickup element is driven, a band-like high brightness area occurs only in a part of a frame. In this case, in the above Japanese Laid-Open Patent Publication (Kokai) No. 2012-156634, a flash-eliminated image is output where a pixel having a high brightness value in a frame in which a band-like gap in brightness occurs is replaced with a pixel having a low brightness value in the next frame. In such a method, it is difficult to combine a full flash image if the band-like high brightness area occurs only in a part of one frame.

Therefore, to obtain a full flash image using the technique disclosed in the above Japanese Laid-Open Patent Publication (Kokai) No. 2012-156634, a shutter speed in a mode for performing the compensation of the band-like gap in brightness needs to have the same length as the frame rate of the image pickup apparatus. For this reason, a user of the image pickup apparatus cannot optionally change a shutter speed when selecting an action to compensate the band-like gap in brightness.

SUMMARY OF THE INVENTION

The present invention provides an image pickup apparatus that can change a shutter speed while compensating a band-like gap in brightness occurred in a frame and a method of controlling the image pickup apparatus, and a storage medium.

To achieve the above object, according to a first aspect of the present invention, there is provided an image pickup apparatus that shoots a moving image, comprising an image pickup element capable of reading signal at a rate higher than a frame rate at which the moving image is output to an external device, a generating unit configured to generate an image from a signal output from the image pickup element, for each frame, a detecting unit configured to detect a frame the image of which has a band-like gap in brightness from among the frames generated by the generating unit, a compensating unit configured to generate a full flash image from images of a plurality of the frames detected by the detecting unit, and a changing unit configured to change, when an accumulating time of a signal in the image pickup element is changed, a frame rate at which signals are read from the image pickup element to substantially match a reciprocal number of the changed accumulating time, and wherein when the detecting unit detects the band-like gap in brightness, the compensating unit outputs the images of the frames generated by the generating unit after replacing the images of the plurality of the frames with the created full flash image and images of the other frames with no band-like gap in brightness. Further, according to a second aspect of the present invention, there is provided an image pickup apparatus comprising an exposure period setting unit configured to adjust start and end timings for accumulating electric charge at an image pickup element on unit area basis to set an exposure period of each unit area thereof, a control unit configured to control a rate for reading the signal by the image pickup element, a generating unit configured to generate an image based on the signal read by the image pickup element, for each frame, a detecting unit configured to detect a frame the image of which has a band-like gap in brightness from among the frames generated by the generating unit, a setting unit configured to set a mode for the image pickup apparatus, wherein the control unit is configured to change the rate in accordance with the exposure period set by the exposure period setting unit, in the case where the mode set by the setting unit is a compensating mode for compensating the band-like gap in brightness in the image of the frame detected by the detecting unit.

In the present invention, when the accumulating time (shutter speed) of a signal in an image pickup element is changed, a frame rate at which a signal is read from the image pickup element is made to be identical to the accumulating time. In such a manner, a shutter speed can be changed while compensating the band-like gap in brightness with a time taken to read a signal of one frame from the image pickup element as an upper limit, which enhances the degree of setting flexibility of shooting conditions.

Further features of the present invention will become apparent from the following description of exemplary embodiments (with reference to the attached drawings).

DESCRIPTION OF THE EMBODIMENTS

The present invention will now be described in detail with reference to the drawings showing preferred embodiments thereof. It should be noted that the relative arrangement of the components, the numerical expressions and numerical values set forth in these embodiments do not limit the scope of the present invention unless it is specifically stated otherwise.

Figure 1:
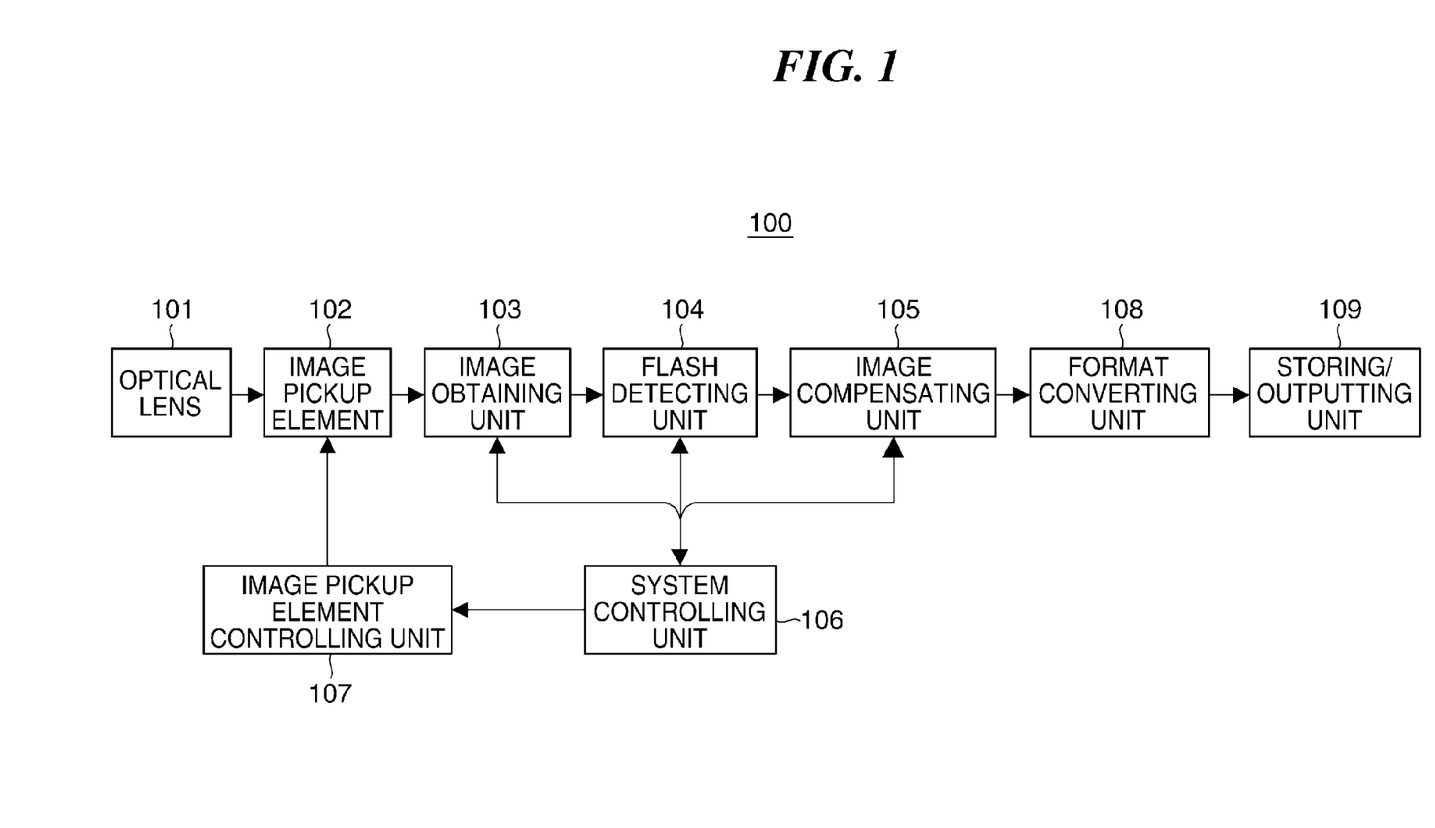
FIG. 1 is a block diagram showing the schematic configuration of an image pickup apparatus according to an embodiment of the present invention.

FIG. 1 is a block diagram showing the schematic configuration of an image pickup apparatus 100 according to an embodiment of the present invention. The image pickup apparatus 100 is typically a digital still camera or a digital video camera having a video shooting function, but is not limited to them, and may be one of various electronic devices having a camera function (a shooting function in which an image pickup element is used to obtain a moving image). For example, the image pickup apparatus 100 may be a portable communication terminal with the camera function (e.g., a mobile phone and smartphone), a portable computer with the camera function (a tablet computer), a portable game console with the camera function, or the like.

The image pickup apparatus 100 includes an optical lens 101, an image pickup element 102, an image obtaining unit 103, a flash detecting unit 104, an image compensating unit 105, a system controlling unit 106, an image pickup element controlling unit 107, a format converting unit 108, and a storing/outputting unit 109.

The optical lens 101 receives reflected light from a subject, and forms a subject image on the image pickup element 102. The optical lens 101 is, more specifically, a focus lens that brings the subject into focus, or a zoom lens or the like that changes a focal distance. The image pickup optical system including the optical lens 101 includes a diaphragm mechanism (not shown) or the like that adjusts the amount of light and the depth of field.

The image pickup element 102 converts a subject image (optical image) formed by the optical lens 101 into an electric signal (analog signal) and provides the converted electric signal to the image obtaining unit 103. In the present embodiment, the image pickup element 102 is assumed to be a CMOS sensor that features a reading time for one frame shorter than 59.94 fps (a vertical synchronizing signal VD of 16.67 ms), which is a frame rate of typical displaying devices.

The image obtaining unit 103 is an image forming unit that generates an image signal including digital data for each frame from the analog signal being a moving image signal obtained from the image pickup element 102. The image obtaining unit 103 converts the analog signal obtained from the image pickup element 102 into the digital signal through A/D conversion, and further performs a predetermined developing process including a brightness level compensating process and a white-balance process to generate the image signal (image information or image data). It should be noted that if the image pickup element 102 has an A/D converting function, the A/D converting function is unnecessary for the image obtaining unit 103.

Based on the image signal obtained from the image obtaining unit 103, the flash detecting unit 104 detects a frame made of an image signal having a band-like gap in brightness due to an external flash such as strobe light (flash light), and transmits the detection result to the system controlling unit 106 as well as the obtained image signal to the image compensating unit 105. The image compensating unit 105 performs image combining using a plurality of frames each made of an image signal having the band-like gap in brightness to compensate the band-like gap in brightness. Specifically, the image compensating unit 105 generates a full flash image from image signals of consecutive frames each detected by the flash detecting unit 104 as a frame made of an image signal having the band-like gap in brightness, and outputs the frames transmitted from the flash detecting unit 104 after replacing the image signal of the plurality of frames with an image signal formed by the above generated full flash image and image signals of other frames in which no band-like gap in brightness occurs. Namely, the image compensating unit 105 performs image combining using at least two image signals each having the band-like gap in brightness to generate a combined image with no band-like gap in brightness. Hereinafter, a band-like high brightness area in an image signal having the band-like gap in brightness due to an external flash such as strobe light (flash light) calls a flash band.

The system controlling unit 106 includes a CPU (not shown), a ROM that stores various programs to be executed by the CPU, a RAM that is used as a work area for the CPU and stores various calculated values and parameters in a calculation process by the CPU, and the like. The system controlling unit 106 determines an action of the image pickup apparatus 100 according to an operation of the image pickup apparatus 100 by a user, and controls the actions of the functional blocks to control the whole action of the image pickup apparatus 100.

The image pickup element controlling unit 107 performs a control relating to the driving of the image pickup element 102 under the control of the system controlling unit 106. For example, the image pickup element controlling unit 107 performs a control such as determining a shutter speed (equal to an accumulating time of a signal (electric charge) and an exposure period) and inputting a vertical synchronizing signal VD into the image pickup element 102. The image pickup element controlling unit 107 can also adjust the start and end timings for accumulating the electric charge at the image pickup element 102 on unit area basis to set the exposure period of each unit area thereof.

The frame rate of the moving image signal output from the image compensating unit 105 (identical to a frame rate at which a signal (accumulated electric charge) is read from the image pickup element 102) can be set higher than a frame rate at which the storing/outputting unit 109 processes the moving image signal. In this case, the format converting unit 108 performs a culling process or the like on the image obtained from the image compensating unit 105 such that the moving image signal is input into the storing/outputting unit 109 at the frame rate at which the storing/outputting unit 109 processes the moving image signal. The storing/outputting unit 109 performs a process to store the moving image signal provided from the format converting unit 108 in a storage medium (not shown), and a process to output the moving image signal to a displaying device (not shown).

Figure 2:
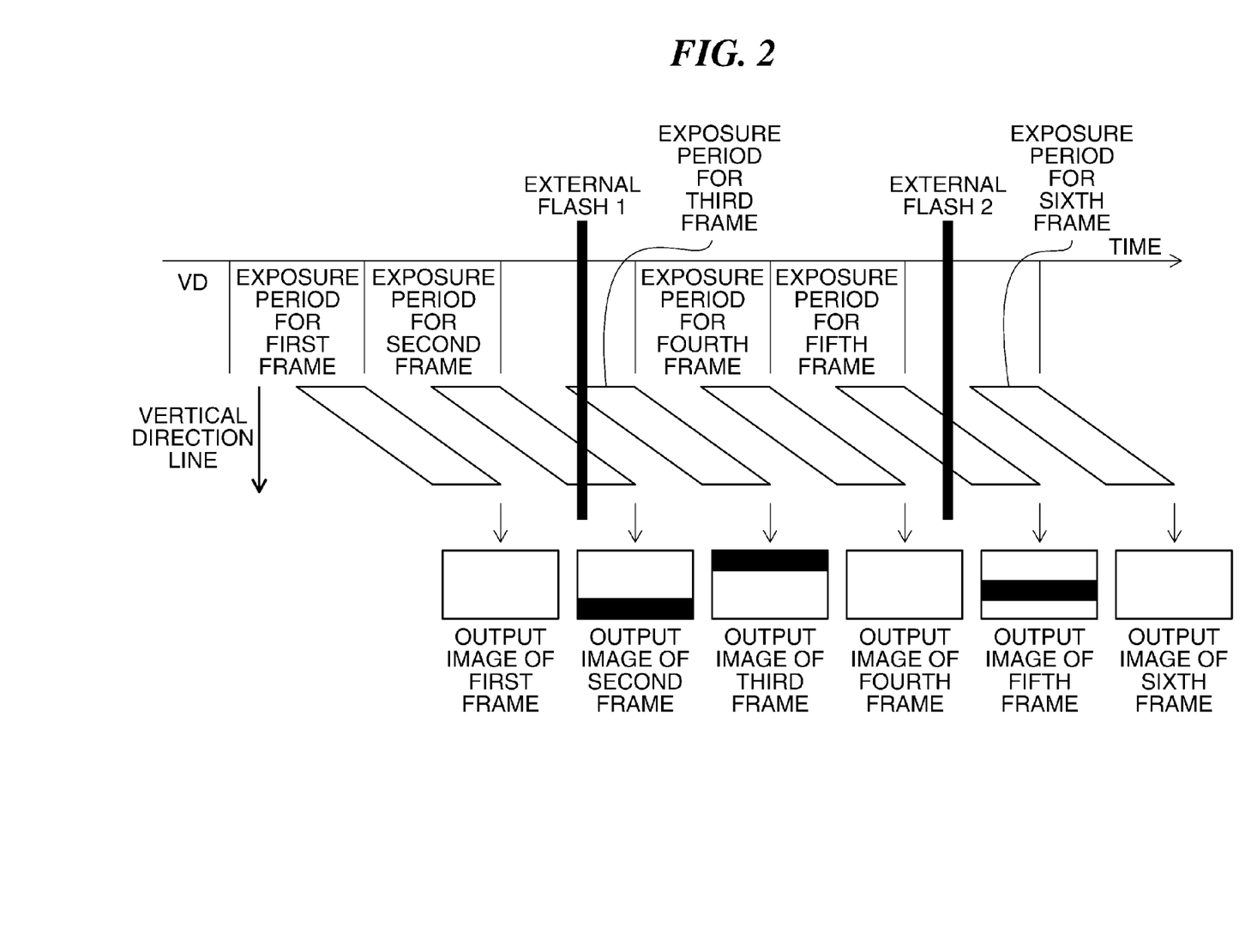
FIG. 2 is a diagram schematically showing the relation, in the case where an exposure period is made short in a typical CMOS sensor, between reading signals from the CMOS sensor and an output image for an external flash.

There will be now described a problem with typical CMOS sensors in the case where the shutter speed (i.e. the accumulating time of the signal (electric charge)) is made shorter than the period of the vertical synchronizing signal VD. FIG. 2 is a diagram schematically showing the relation, in the case where the shutter speed is made short in the typical CMOS sensor, between reading the signals from the CMOS sensor and an output image for the external flash (an image for each frame). FIG. 2 shows the relation between the occurrence timings of the external flashes and the output images, where a horizontal axis represents time and a vertical axis represents the number of vertical direction lines. The vertical synchronizing signals VD represented by the horizontal axis are shown with timings at which they are input into the image pickup element 102.

At the timing of an external flash 1 shown in FIG. 2, a flash band occurs in a lower portion in the output image of the second frame. It should be noted that a lower portion in the output image of the second frame filled in black indicates the occurrence area of the flash band (high-brightness region), and it is assumed that similar indication is used in the other output images in the following description. At this point, a flash band also occurs in an upper portion in the output image of the third frame, and the flash band in the output image of the third frame does not reach the occurrence starting line of the flash band in the output image of the second frame. In addition, at the timing of an external flash 2, a flash band occurs in the fifth frame. At this point, only a part of a line overlaps with the exposure period of the fifth frame, and thus the flash band occurs only in a portion in the output image of the fifth frame.

When the flash bands shown in FIG. 2 occur in the output images, combining the images of two frames over which the flash band occurs cannot obtain a full flash image compensated for the flash band. To deal with this problem, in the present embodiment, a CMOS sensor is used as the image pickup element 102, which can perform such a high-speed reading that a time to read an accumulated electric charge of one frame is shorter than a frame rate of 59.94 fps (a vertical synchronizing signal VD of 16.67 ms) used in the typical displaying device.

Figure 3:
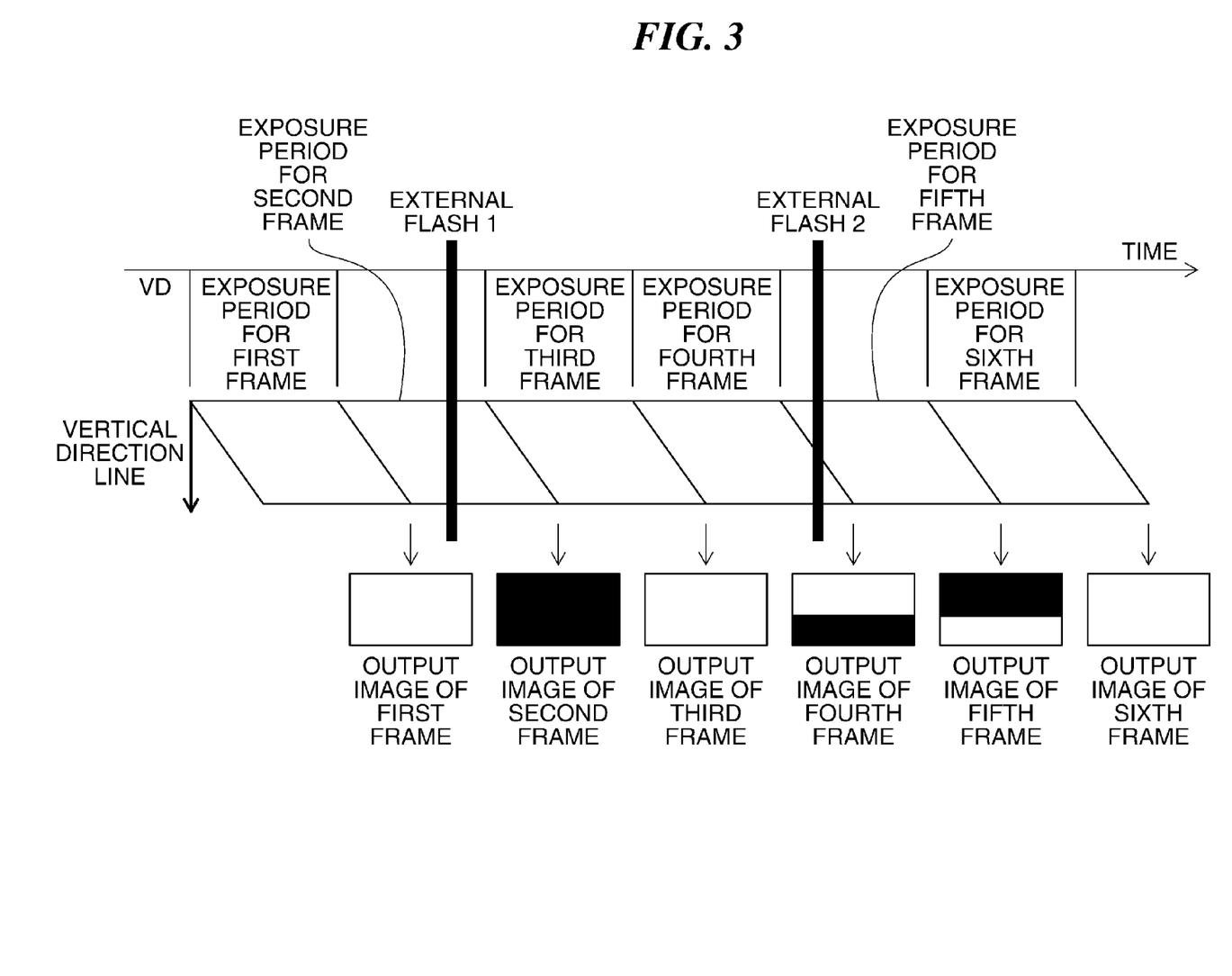
FIG. 3 is a diagram schematically showing the relation, in the case where an image pickup element is a CMOS sensor capable of high-speed reading, between reading signals from the image pickup element and an output image for an external flash.

FIG. 3 is a diagram schematically showing the relation, in the case where the image pickup element 102 (the CMOS sensor capable of high-speed reading) is used, between reading the signals from the image pickup element 102 and an output image for the external flash. As with FIG. 2, FIG. 3 also shows the relation between the occurrence timings of the external flashes and the output images, where a horizontal axis represents time and a vertical axis represents the number of vertical direction lines, and the vertical synchronizing signals VD are shown with timings at which they are input into the image pickup element 102. It should be noted that the scale of the horizontal axis in FIG. 2 is different from the scale of the horizontal axis in FIG. 3.

At the timing of an external flash 1, an external flash appears from an upper portion to a lower portion in the second frame, resulting in a flash band appearing in the output image of the second frame, and the output image of the second frame at this point is a full flash image. In addition, at the timing of an external flash 2, flash bands occur in a lower portion of the output image of the fourth frame and in the output image of the fifth frame. At this point, the flash band in the output image of the fifth frame reaches the occurrence starting line of the flash band in the output image of the fourth frame, and thus the full flash image can be combined using a conventional compensating method such as two-frame combining.

As seen above, in the present embodiment, using the CMOS sensor capable of high-speed reading as the image pickup element 102 enables flash band compensation in which the problem described with reference to FIG. 2 is solved, while supporting a high-speed shutter speed the upper limit of which is the reading time of the signals from the image pickup element 102.

Figure 4:
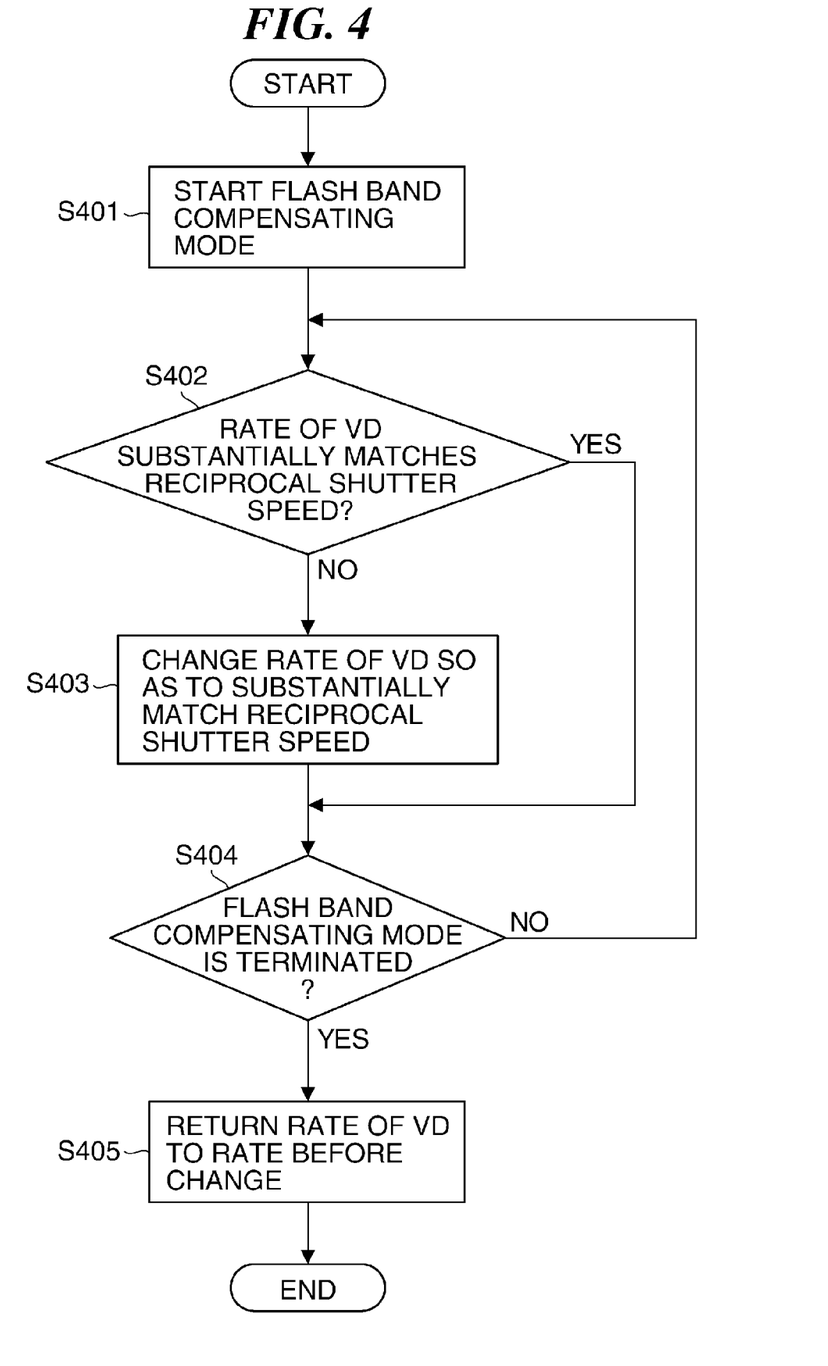
FIG. 4 is a flow chart showing the flow of a process performed when the image pickup apparatus according to the present embodiment is set to a flash band compensating mode.

FIG. 4 is a flow chart showing the flow of a process performed when the image pickup apparatus 100 is set to a flash band compensating mode. The flash band compensating mode is a mode for compensating a band-like gap in brightness in an image having the gap. Each process in FIG. 4 is executed by the CPU included in the system controlling unit 106 expanding a predetermined program stored in the ROM onto the RAM and controlling the functional blocks of the image pickup apparatus 100.

When a user operates an operating unit (not shown) included in the image pickup apparatus 100, in step S401, the system controlling unit 106 receiving an instruction from the operating unit sets the flash band compensating mode to the image pickup apparatus 100. In subsequent step S402, the system controlling unit 106 determines whether a rate of the vertical synchronizing signals VD output from the image pickup element controlling unit 107 to the image pickup element 102 substantially matches a reciprocal number of a shutter speed selected by the user. In the present embodiment, the system controlling unit 106 determines that the rate substantially matches the reciprocal number if the difference between them is within a predetermined range. It should be noted that, this determination method is not intended to limit the present invention, for example, if a reciprocal number of a shutter speed among selectable shutter speeds is the closest to the rate, the system controlling unit 106 may determine that the rate substantially matches the reciprocal number. The process proceeds to step S404 when the rate of the vertical synchronizing signal VD substantially matches the reciprocal number of the shutter speed (YES in step S402), while the process proceeds to step S403 when the rate of the vertical synchronizing signal VD does not substantially match the reciprocal number of the shutter speed (NO in step S402).

In step S403, the system controlling unit 106 changes the rate of the vertical synchronizing signal VD (i.e. a signal reading rate from the image pickup element 102) such that the rate of the vertical synchronizing signal VD matches the reciprocal number of the shutter speed, and then the process proceeds to step S404. In step S404, the system controlling unit 106 determines whether an instruction to terminate the flash band compensating mode is given through the operating unit by the user. The process returns to step S402 until the instruction to terminate the flash band compensating mode is given (NO in step S404), and terminates the flash band compensating mode when the instruction to terminate the flash band compensating mode is given (YES in step S404). Subsequently, in step S405, the system controlling unit 106 returns the rate of the vertical synchronizing signal VD to the rate before the change upon terminating the flash band compensating mode, and terminates the present flow chart afterward.

Figure 5:
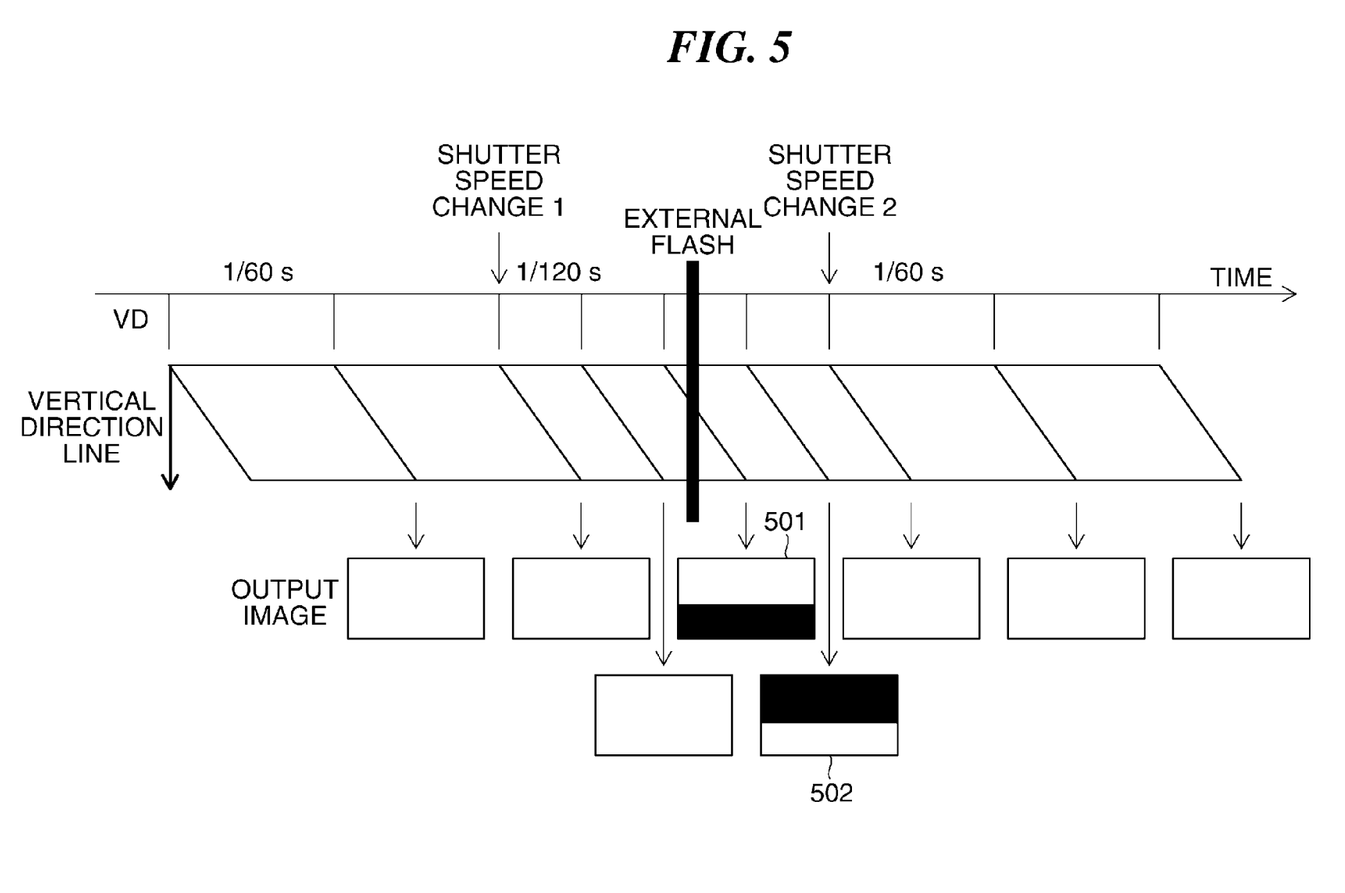
FIG. 5 is a diagram that depicts the occurrence of a flash band in the case where the reciprocal number of a shutter speed is matched with the rate of a vertical synchronizing signal VD through step S403 in FIG. 4.

FIG. 5 is a diagram that depicts the occurrence of a flash band in the case where the reciprocal number of the shutter speed is matched with the rate of the vertical synchronizing signal VD through step S403 in FIG. 4, and is shown in a form similar to those of FIG. 2 and FIG. 3. A user changes the setting of the shutter speed from 1/60 second to 1/120 second at the timing of a shutter speed change 1 during shooting in the flash band compensating mode. The system controlling unit 106 receiving this operation transmits the information on the set shutter speed to the image pickup element controlling unit 107, and the image pickup element controlling unit 107 changes the rate of the vertical synchronizing signal VD to be output to the image pickup element 102 from 60 Hz to 120 Hz. When an external flash occurs afterward, flash bands occur over output images 501 and 502 of two frames since the reciprocal number of the shutter speed and the rate of the vertical synchronizing signal VD are both 120 Hz. At this point, the flash band in the output image 502 reaches the occurrence starting line of the flash band in the output image 501, and thus a full flash image can be combined using the output images 501 and 502 through the conventional compensating method.

It should be noted that, in FIG. 5, the user returns the shutter speed from 1/120 second to 1/60 second in a shutter speed change 2, and the rate of the vertical synchronizing signal VD is returned from 120 Hz to 60 Hz, accordingly. In addition, in a normal mode different from the flash band compensating mode, the rate of the vertical synchronizing signal VD is not changed even when the setting of the shutter speed is changed from 1/60 second to 1/120 second giving a higher priority to stabilizing the rate of the vertical synchronizing signal VD.

As described above, in the present embodiment, if the shutter speed is changed when the image pickup apparatus 100 is in the flash band compensating mode, the rate of the vertical synchronizing signal VD is controlled to substantially match the reciprocal number of the shutter speed following to this change. This prevents the occurrence of a situation where the flash band occurs in only a portion in an image in the case where only the shutter speed is simply changed, thereby enabling a full flash image compensated for the flash band to be generated through image combining of a plurality of frames.

Next, there will be described the action of the storing/outputting unit 109 when the shutter speed of the image pickup element 102 is matched with the rate of the vertical synchronizing signal VD input into the image pickup element 102. The storing/outputting unit 109 normally performs storage at a specified frame rate in a storage medium, notably a SD card, a CompactFlash® card, or the like, and outputs a display signal to an external displaying device at the same time.

The displaying devices in the mainstream typically support a shutter speed of 60 (59.94 strictly) fps or 50 fps, and thus in many cases the storage in a storage medium is performed at the same rate with a few exceptions. For this reason, for example, when the shutter speed of the image pickup element 102 is made to be 120 fps (=1/120 second), the format converting unit 108 needs to cull the frame images obtained from the image compensating unit 105 in a predetermined pattern (i.e. to cull every other frame) to output the culled frame images to the storing/outputting unit 109 at 60 fps.

Figure 6:
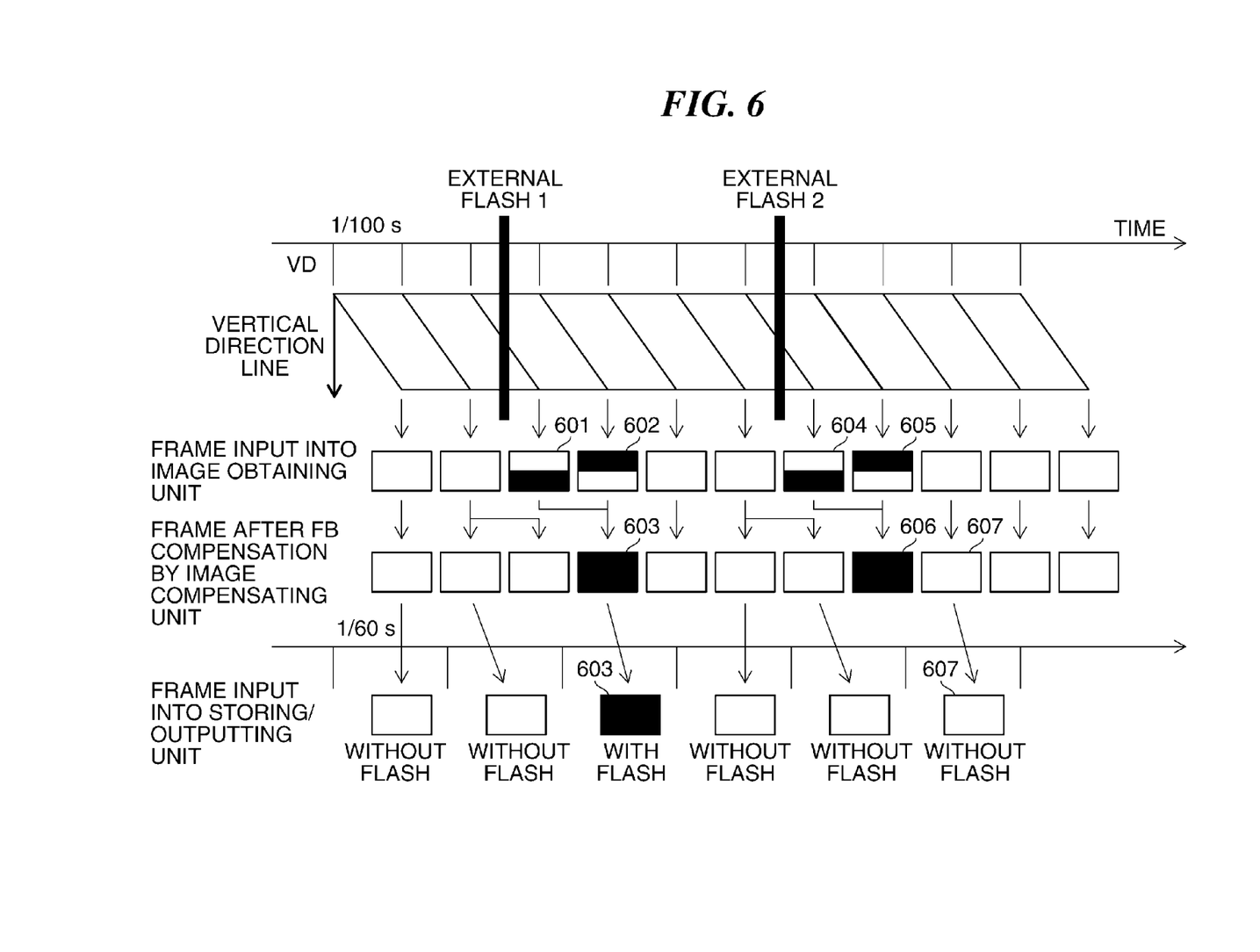
FIG. 6 is a diagram showing an example in which a format converting unit culls frame images obtained from the image compensating unit in a predetermined pattern and outputs the culled frame images to the storing/outputting unit, in the case where the shutter speed of the image pickup element and the rate of the vertical synchronizing signal VD are made to be $1/100$ second.

FIG. 6 is a diagram showing an example in which the format converting unit 108 culls the frame images obtained from the image compensating unit 105 in the above predetermined pattern and outputs the culled frame images to the storing/outputting unit 109 in the case where the shutter speed of the image pickup element 102 and the rate of the vertical synchronizing signal VD is made to be 1/100 second (=100 fps). It should be noted that "FB" in FIG. 6 stands for a "flash band."

The image obtaining unit 103 and the image compensating unit 105 output images every 1/100 second, whereas the storing/outputting unit 109 outputs images every 1/60 second. Such an action is called "5:3 pull-down." Due to an external flash 1, the image obtaining unit 103 receives consecutive two frames 601 and 602 in which flash bands occur. The flash detecting unit 104 detects the flash bands, and the image compensating unit 105 performs the flash band compensation such as two-frame combining on the frames 601 and 602 to generate a frame 603 being a full flash image.

Since the storing/outputting unit 109 outputs images every 1/60 second, the format converting unit 108 culls two frames from five frames output from image pickup element 102 (image compensating unit 105), to output three frames. Here, it is assumed that the culling is performed according to a rule that the third and fifth frames are culled from the consecutive five frames. In this case, the frame 603 subjected to the flash band compensation that occurs due to the external flash 1 is to be subjected to format conversion and input into the storing/outputting unit 109.

Meanwhile, two frames 604 and 605 in which flash bands occur due to an external flash 2 are combined to generate a frame 606 being a full flash image is generated. Here, if frames are culled in the same pattern as the above-described pattern in which two frames are culled from five frames, the frame 606 is selected to be culled, and the next normal frame 607 is to be output to the storing/outputting unit 109. This makes the moving image as if no external flash occurs despite the occurrence of the external flash. To prevent such a situation, as shown in FIG. 7, the format converting unit 108 adjusts a frame to be input into the storing/outputting unit 109.

Figure 7:
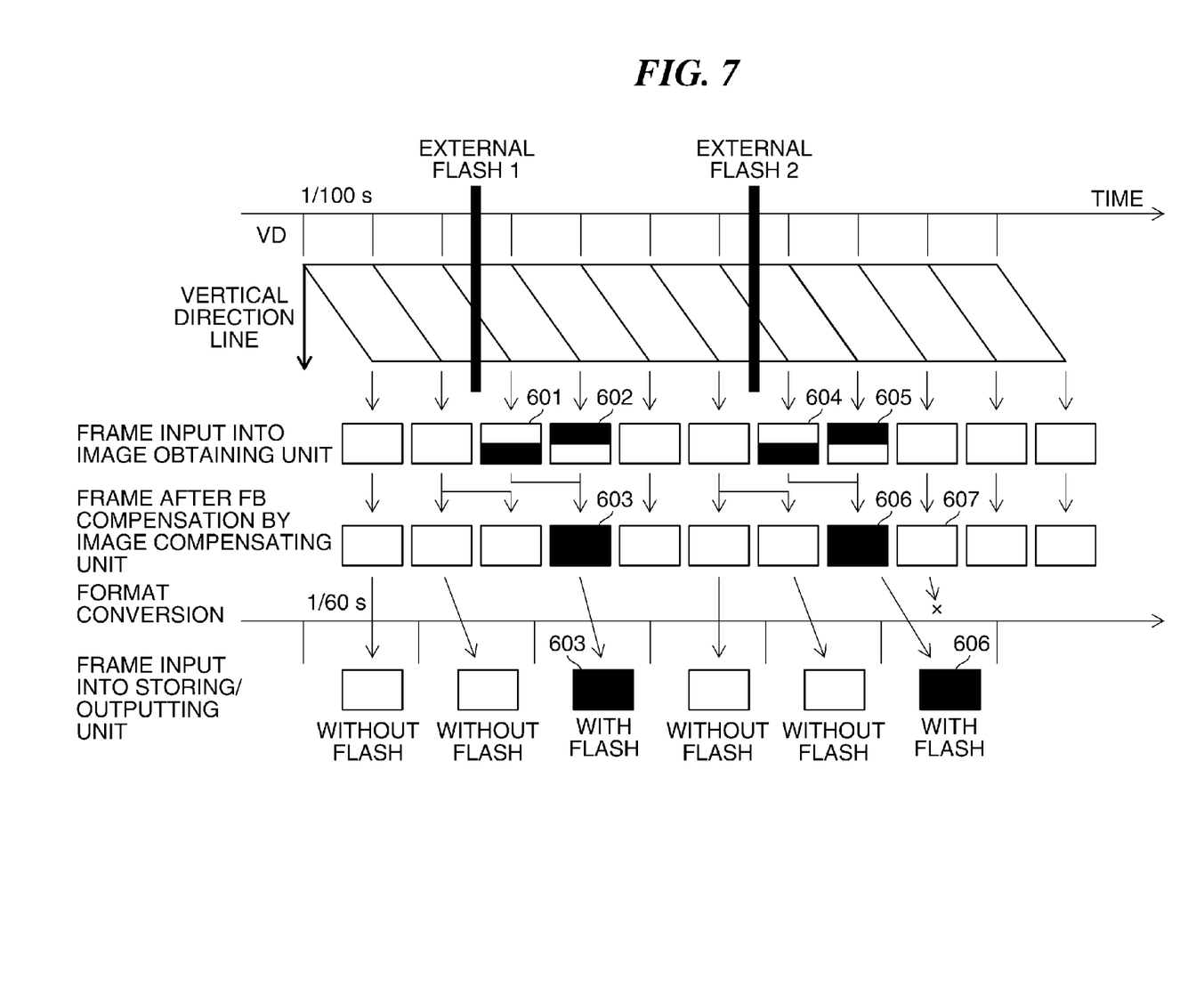
FIG. 7 is a diagram showing an example in which the format converting unit adjusts the culling of the frame images in the above predetermined pattern in FIG. 6 in the case where the shutter speed of the image pickup element and the rate of the vertical synchronizing signal VD is made to be $1/100$ second.

FIG. 7 is a diagram showing an example in which the format converting unit 108 adjusts the culling of the frame images in the above predetermined pattern in FIG. 6 in the case where the shutter speed of the image pickup element 102 and the rate of the vertical synchronizing signal VD is made to be 1/100 second. Although not shown in FIG. 7, it is assumed here that when detecting a flash band, the flash detecting unit 104 notifies the format converting unit 108 of a signal indicating the detection (hereafter, referred to as "flash band detection signal"). The format converting unit 108 then adjusts two frames to be culled from five frames so as to preferentially output the frame of a full flash image subjected to the flash band compensation to the storing/outputting unit 109. The frame 606, which is a full flash image culled in the example in FIG. 6, is output to the storing/outputting unit 109 without being culled in the example in FIG. 7. This enables displaying and storing an image indicating the occurrence of an external flash without fail.

Figure 8:
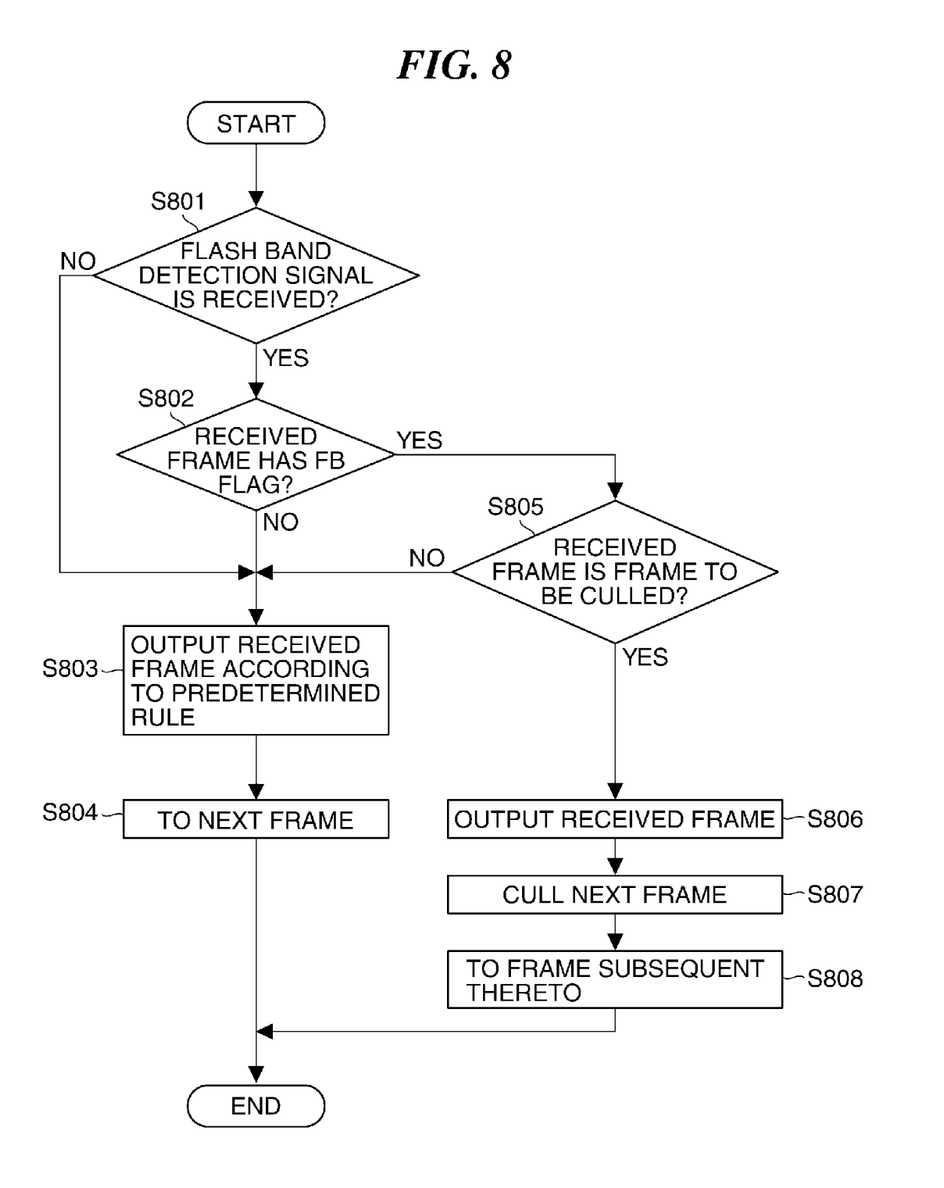
FIG. 8 is a flow chart showing the flow of a process of the format converting unit to implement the example in FIG. 7 when a frame rate is converted while performing the flash band compensation.

There will be described the action of the format converting unit 108 to adjust the frames to be input into the storing/outputting unit 109 with reference to FIG. 8. FIG. 8 is a flow chart showing the flow of a process of the format converting unit 108 to implement the example in FIG. 7 when the frame rate is converted while performing the flash band compensation.

In step S801, the format converting unit 108 determines whether or not to receive the flash band detection signal from the flash detecting unit 104. When receiving the flash band detection signal (YES in step S801), the process proceeds to step S802, and when not receiving the flash band detection signal (NO in step S801), the process proceeds to step S803. It should be noted that, although not shown, when the flash detecting unit 104 detects a flash band, the image compensating unit 105 adds a flash band flag (hereafter, referred to as "FB flag") to a frame being a full flash image that is generated through the flash band compensation. This enables the format converting unit 108 to readily determine whether a frame is subjected to the flash band compensation.

In step S802, the format converting unit 108 determines whether the FB flag is added to a frame received from the image compensating unit 105. When detecting the FB flag (YES in step S802), the process proceeds to step S805, and when not detecting the FB flag (NO in step S802), the process proceeds to step S803.

In step S803, the format converting unit 108 outputs the received frame to the storing/outputting unit 109 according to the above predetermined rule. More specifically, if the received frame is culled when it is the third or fifth frame among the consecutive five frames, or output to the storing/outputting unit 109 when it is one of the other frames. Subsequently, the process proceeds to step S804, and returns to step S801 again to start processing the next frame. In contrast, in step S805, the format converting unit 108 determines whether or not the received frame is a frame to be culled. When the frame with the added FB flag is the first, second, or fourth frame among the consecutive five frames, that is, when the frame is not the frame to be culled according to the above predetermined rule (in the case of the frame 603: NO in step S805), the process proceeds to step S803. In contrast, in step S805, when the received frame is the third or fifth frame among the consecutive five frames, that is, when the received frame is the frame to be culled according to the above predetermined rule (in the case of the frame 606: YES in step S805), the format converting unit 108 outputs the frame to the storing/outputting unit 109 (step S806), culls the next frame (in the case of the frame 607 in FIG. 7: step S807), and then the process proceeds to step S808 and returns to step S801 again to start processing a frame subsequent to the next frame.

As described above, in the present embodiment, in the case where a frame being a full flash image is generated through the flash band compensation when the format converting unit 108 performs the pull down process, the frame being the full flash image is always used as a flame to be output to the storing/outputting unit 109, which enables to store a moving image without missing a scene, such as a scene in a press conference where strobe light is frequently flashed, thus the stored moving image could make the scene alive. It should be noted that, in the flow chart of FIG. 8, as shown in FIG. 7, the frame (frame 607) next to the frame (frame 606) with the FB flag is culled, but this is not intended to limit the present invention. For example, the format converting unit 108 may be configured, when receiving the flash band detection signal (YES in step S801), not to output frames to the storing/outputting unit 109 but to wait for the frame with the added FB flag to be input, and when the frame with the FB flag added thereto is input afterward, to output the frame to the storing/outputting unit 109 to cull the frame prior to the frame with the FB flag. It should be noted that if the image pickup apparatus 100 has a storage unit or a display unit, the storing/outputting unit 109 may store the culled flame in the storage unit and output a display signal to the displaying unit at the same time.

Alternatively, the present invention may apply to a system configured by a plurality of devices, or to an apparatus configured by one device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-051586, filed Mar. 14, 2014, which is hereby incorporated by reference herein in its entirety.

What is claimed is:

1. An image pickup apparatus comprising:
an exposure period setting unit configured to adjust start and end timings for accumulating electric charge at an image pickup element on unit area basis to set an exposure period of each unit area thereof;
a control unit configured to control a rate for reading the signal by said image pickup element;
a generating unit configured to generate an image based on the signal read by the image pickup element, for each frame;
a detecting unit configured to detect an image of which has a band-like gap in brightness from among the images generated by said generating unit;
a setting unit configured to set a mode for the image pickup apparatus;
wherein said control unit is configured to change the rate in accordance with the exposure period set by said exposure period setting unit, in the case where the mode set by said setting unit is a compensating mode for compensating the band-like gap in brightness in the image of the frame detected by said detecting unit.

2. The image pickup apparatus according to claim 1, wherein said control unit is configured not to change the rate in accordance with the exposure period set by said exposure period setting unit, in the case where the mode set by said setting unit is not the compensating mode.

3. The image pickup apparatus according to claim 1, wherein said control unit is configured to change the rate to substantially match a reciprocal number of the exposure period.

4. The image pickup apparatus according to claim 1 further comprising a compensating unit configured to compensate the band-like gap in brightness by performing image combining using a plurality of images each having the band-like gap in brightness.

5. The image pickup apparatus according to claim 4 wherein said compensating unit is configured to generate a combined image with no band-like gap in brightness by performing image combining using two images having the band-like gap in brightness read as images of two consecutive frames.

6. The image pickup apparatus according to claim 5 wherein said compensating unit is configured to generate the combined image using a band-like high brightness area in each of the two images having the band-like gap in brightness.

7. The image pickup apparatus according to claim 5 further comprising a selecting unit configured to select an image among a plurality of images including the image generated by said generating unit other than the two images and the combined image generated by said compensating unit, and
wherein said selecting unit is configured to preferentially select the combined image generated by said compensating unit.

8. A method of controlling an image pickup apparatus comprising:
an exposure period setting step of adjusting start and end timings for accumulating electric charge at an image pickup element on unit area basis to set an exposure period of each unit area thereof;
a control step of controlling a rate for reading the signal by the image pickup element;
a generating step of generating an image based on the signal read by the image pickup element, for each frame;
a detecting step of detecting an image of which has a band-like gap in brightness from among the images generated in said generating step;
a setting step of setting a mode for the image pickup apparatus;
wherein the rate is changed in said control step in accordance with the exposure period set in said exposure period setting step, in the case where the mode set in said setting step is a compensating mode for compensating the band-like gap in brightness in the image of the frame detected in said detecting step.

9. A non-transitory computer-readable storage medium having stored therein a program for causing a computer to implement a method of controlling an image pickup apparatus, the method comprising:
an exposure period setting step of adjusting start and end timings for accumulating electric charge at an image pickup element on unit area basis to set an exposure period of each unit area thereof;
a control step of controlling a rate for reading the signal by the image pickup element;
a generating step of generating an image based on the signal read by the image pickup element, for each frame;
a detecting step of detecting an image of which has a band-like gap in brightness from among the images generated in said generating step;
a setting step of setting a mode for the image pickup apparatus;
wherein the rate is changed in said control step in accordance with the exposure period set in said exposure period setting step, in the case where the mode set in said setting step is a compensating mode for compensating the band-like gap in brightness in the image of the frame detected in said detecting step.

* * * * *